UNITED STATES PATENT OFFICE.

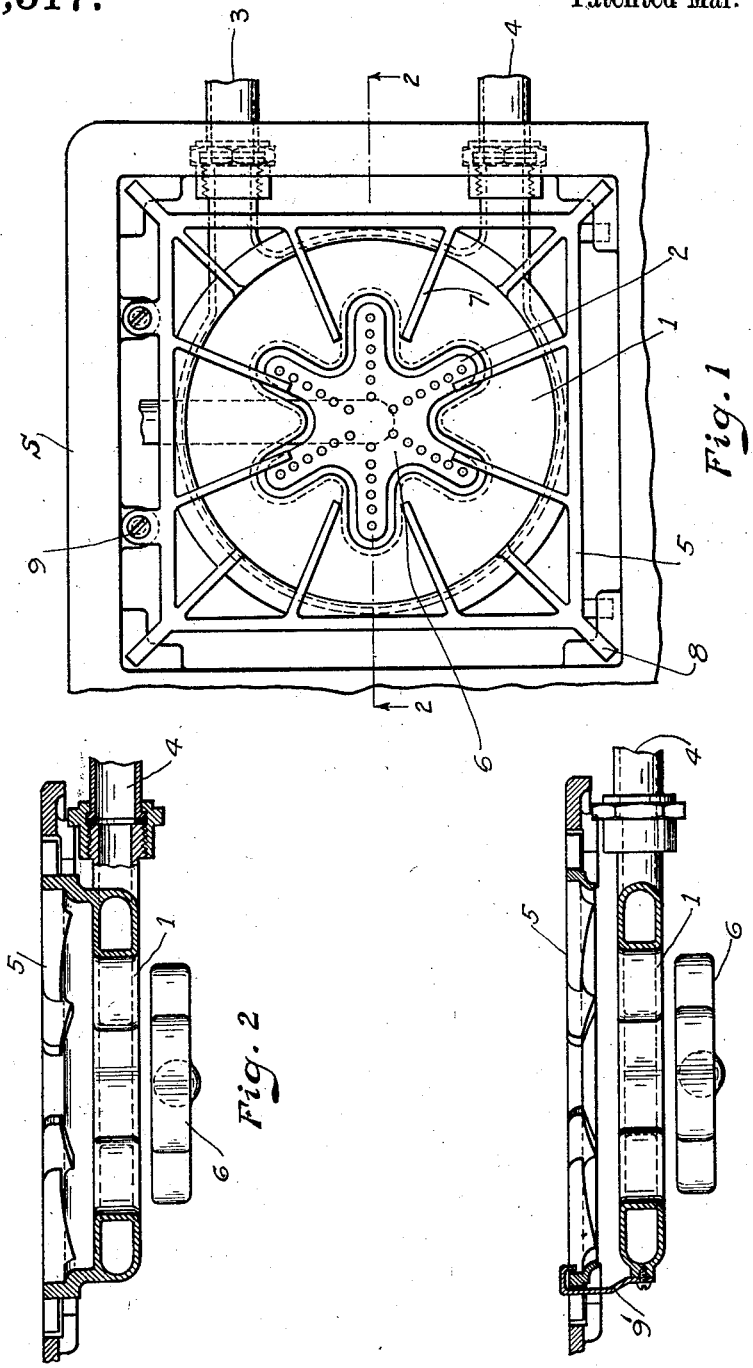

CHARLES E. KANTOR AND FRANK SCHORIK, OF CHICAGO, ILLINOIS.

WATER-HEATING ATTACHMENT.

1,408,517.  Specification of Letters Patent.  Patented Mar. 7, 1922.

Application filed April 18, 1921. Serial No. 462,364.

*To all whom it may concern:*

Be it known that we, CHARLES E. KANTOR and FRANK SCHORIK, citizens of the United States, and residents of the city of Chicago, county of Cook, and State of Illinois, have invented certain new and useful Improvements in Water-Heating Attachments, of which the following is a specification.

Our invention relates to a novel water heating attachment to be applied to gas, oil, or other stoves and has for its object the provision of a quickly detachable or attachable hot water heating device to be used with such a stove. The attachment is adapted to be interposed between the flame issuing from the usual burner of the stove and the ordinary supporting plate for cooking vessels. We preferably make the hot water device and the cooking vessel integral, as this arrangement facilitates the attachment or removal of the device.

Our invention provides for cooking food, heating water and warming the air of the compartment in which same is used by means of an ordinary gas or kerosene burner at one time, thereby saving fuel, time and labor.

Other objects will appear hereinafter.

The invention consists in the combinations and arrangements of parts hereinafter described and claimed.

The invention will be best understood by reference to the accompanying drawings forming a part of this specification, and in which, Fig. 1 is a top plan view of the water heating attachment as applied to an ordinary gas or kerosene stove;

Fig. 2 is an edge view of the attachment on line 2—2 of Fig. 1; and,

Fig. 3 is a similar edge view of the water heating attachment attached to an ordinary form of cooking vessel support.

Our attachment preferably comprises a hollow disk 1 having a preferably concentric star-shaped aperture 2 therein and being provided with radially disposed circumferential openings 3 and 4 for the entry and discharge of water. The disk 1 as shown in the drawing has a six pointed star-shaped aperture, but the shape of this aperture may be varied to suit different conditions.

The openings 3 and 4 of the heating disk 1 may be connected to any suitable water supply (not shown) and to an ordinary home storage tank (not shown) respectively, in the usual manner; or a small portable tank may be provided to store the water heated by the disk 1.

The hollow disk 1 is preferably formed integral with a rectangular spider 5 as shown in Fig. 1, and such spider is provided with radially projecting lugs 8 for supporting the attachment in position, the lugs 8 being adapted to rest on the top of a gas or kerosene stove S in the usual manner and to be secured thereto by means of screws 9 engaging threaded sockets in said stove. The spider 5 carrying the disk 1 is then in such a position that the disk 1 is disposed between the flame of the burner 6 and the prongs 7 of the spider which prongs support any suitable cooking vessel.

The supporting spider 5 carrying the water heating disk 1 may be manufactured in various sizes and shapes to fit stoves having a plurality of burners and the disk 1 also may be manufactured in different shapes so as to cover as many burners as desired. The projecting prongs 7 as shown in Fig. 1 may be dispensed with if desired.

As stated the disk 1 and supporting plate 5 are preferably cast integral, but if desired or where necessary, we may construct the water heating disk 1 in such a manner that it can be readily attached to an ordinary supporting spider already on a gas or kerosene stove by means of a hook 9' as shown in Fig. 3 and thus accomplish the same result with possibly greater adaptation in applying the disk 1 under certain circumstances than when the plate and disk are made integral. Said disk and plate are preferably made of cast iron though any suitable material may be used.

It will be observed that by the use of our invention the ordinary gas, or oil stove burner can be utilized to perform the usual cooking operation and at the same time and with the same amount of fuel heat the water, which may be stored in a tank where it will be available for use, and also through radiation of heat from the water heating disk, heating the room in which it is located; and the heat remains in the disk and storage tank a long time after the fuel is cut off from the burner; thus with our invention a housewife can cook her food on an ordinary gas or oil stove in the usual manner, but at the same time instead of having to light an additional burner to heat water for washing purposes, she can store up such water for such uses while cooking and by the same operation have the temperature in the room raised considerably. All of these beneficiary results are obtained without increasing the amount of fuel ordinarily used for cooking alone.

While we have illustrated and described the preferred form of construction for carrying our invention into effect, this is capable of variation and modification without departing from the spirit of the invention. We, therefore, do not wish to be limited to the precise details of the construction set forth, but desire to avail ourselves of such variations and modifications as come within the scope of the appended claims.

Having described our invention what we claim as new and desire to secure by Letters Patent is:—

1. In combination with a burner, a water heating attachment comprising a hollow disc disposed above the flame of said burner and heated thereby; projecting arms on said disc for supporting same in position, and a supporting spider mounted on said projections.

2. In combination with a burner, a water heating attachment comprising a hollow disc disposed above the flame of said burner; convolutions in said disc heated by said flame; projecting arms on said disc for supporting same in position; and a supporting spider mounted on said projections.

3. In combination with a burner, a water heating attachment comprising a hollow disc disposed above the flame of said burner; convolutions in said disc heated by said flame; projecting arms on said disc for supporting same in position; a supporting spider mounted on said projections; and inwardly radiating utensil supporting arms mounted on said spider.

In testimony whereof we have signed our names to this specification in the presence of two subscribing witnesses.

CHARLES E. KANTOR.
FRANK SCHORIK.

Witnesses:
　JOSHUA R. H. POTTS,
　FREDA C. APPLETON.